(12) United States Patent  
Ackley, Jr. et al.

(10) Patent No.: US 8,593,494 B2
(45) Date of Patent: Nov. 26, 2013

(54) METHOD AND APPARATUS FOR PROCESSING AND/OR INSPECTING PELLET-SHAPED ARTICLES

(75) Inventors: E. Michael Ackley, Jr., Mannington, NJ (US); Mark Ford, Deptford, NJ (US); Daniel J. Palmer, North Wales, PA (US)

(73) Assignee: Ackley Machines Corporation, Moorestown, NJ (US)

( * ) Notice: Subject to any disclaimer, the term of this patent is extended or adjusted under 35 U.S.C. 154(b) by 61 days.

(21) Appl. No.: 13/137,323

(22) Filed: Aug. 5, 2011

(65) Prior Publication Data

US 2011/0291329 A1 Dec. 1, 2011

Related U.S. Application Data

(63) Continuation of application No. 12/000,662, filed on Dec. 14, 2007, now Pat. No. 7,995,083.

(60) Provisional application No. 60/874,717, filed on Dec. 14, 2006.

(51) Int. Cl.
*B41J 2/435* (2006.01)

(52) U.S. Cl.
USPC .......................................................... 347/224

(58) Field of Classification Search
USPC .................................................. 347/111, 224
See application file for complete search history.

(56) References Cited

U.S. PATENT DOCUMENTS

| | | | |
|---|---|---|---|
| 3,657,510 A | 4/1972 | Rothrock |
| 4,906,813 A | 3/1990 | Gajdos |
| 5,294,770 A | 3/1994 | Riddle et al. |
| 5,376,771 A | 12/1994 | Roy |
| 5,698,119 A | 12/1997 | Geerke |
| 5,878,658 A | 3/1999 | Ackley |
| 5,894,801 A | 4/1999 | Ackley |
| 5,979,309 A | 11/1999 | Boyce |
| 6,429,889 B1 | 8/2002 | Murokh |
| 6,677,296 B2 | 1/2004 | Bonsall |
| 7,102,741 B2 | 9/2006 | Ackley et al. |
| 7,456,946 B2 | 11/2008 | Ackley et al. |
| 8,102,520 B2 | 1/2012 | Ackley, Jr. et al. |

(Continued)

FOREIGN PATENT DOCUMENTS

| | | |
|---|---|---|
| EP | 0 950 520 A | 10/1999 |
| WO | WO 00/74938 A | 12/2000 |
| WO | WO 2005/123407 | 12/2005 |

OTHER PUBLICATIONS

International Preliminary Search Report for PCT/US2007/025570, dated Jun. 19, 2009.

(Continued)

*Primary Examiner* — Huan Tran
(74) *Attorney, Agent, or Firm* — Nixon & Vanderhye, PC (57) ABSTRACT

A system for marking pellet shaped articles includes a conveyer to convey the pellet-shaped articles along a transport path, and a laser to generate at least one beam to print or etch information on one or more of the pellet-shaped articles. The information includes at least one of alphabetical characters, numeric characters, and/or logos. The information comprises at least one engraving, e.g., two engravings or holes, apertures, etc., that are adjacent one another and at least partially overlapping. The system includes a controller to control x and y or x, y and z coordinates of the beam of the laser relative to the transport path to align the beam with the one or more of the pellet-shaped articles.

10 Claims, 9 Drawing Sheets

(56) References Cited

U.S. PATENT DOCUMENTS

| | | |
|---|---|---|
| 2003/0186001 A1 | 10/2003 | Khan |
| 2004/0094050 A1 | 5/2004 | Ackley, Jr. et al. |
| 2008/0158332 A1 | 7/2008 | Ackley, Jr. et al. |

OTHER PUBLICATIONS

International Search Report for co-pending PCT Application No. PCT/US2007/025570, mailed May 2, 2008 (7 pages).

METHOD AND APPARATUS FOR PROCESSING AND/OR INSPECTING PELLET-SHAPED ARTICLES

CROSS REFERENCE TO RELATED APPLICATIONS

This application is a continuation of U.S. application Ser. No. 12/000,662, filed Dec. 14, 2007, now U.S. Pat. No. 7,995,083, which claims the benefit of U.S. Provisional Application No. 60/874,717, filed Dec. 14, 2006, each incorporated herein by reference in its entirety.

FIELD OF THE INVENTION

The present invention relates to a method and apparatus for conveying pellet-shaped articles. In particular, the invention relates to a processing and/or inspection unit for the pellet-shaped articles.

BACKGROUND OF THE INVENTION

Processing of pellet-shaped articles, e.g., pharmaceuticals such as caplets and tablets, confections (e.g., lentil shaped coated chocolate candies), edible and non-edible articles, etc., is known in the art. Processing operations typically include marking the articles with indicia (e.g., logos, multi-color designs, alpha-numeric, etc.), laser drilling the articles and/or coating the articles. Processing operations are often performed in a sequential manner wherein articles are conveyed past a first processing unit that performs a first processing operation and then past a second processing unit, downstream from the first processing unit, that performs a second processing operation.

Such processing becomes more complicated when the articles are fed in random order to a conveyer and only one of the sides of the pellet-shaped articles is to receive processing. U.S. Pat. No. 5,894,801 to Ackley, incorporated herein by reference in its entirety, discloses a processing and inspection unit in which the articles are monitored and selected ones of the articles which have the wrong side up are flipped such that all of the articles have a common side exposed before processing takes place on the correctly exposed sides. The above process can be useful, for example, if each of the articles is to be laser drilled on only one side but not the other. Article processing becomes even more complicated if both sides of the article are intended to receive different processes, e.g., laser drilling on one side, and printing on the other side.

Where the articles are to be marked with identifying indicia, such as a product name or logo, such marks can be made in several ways. However, predominant is the use of contact printers, such as an offset rotogravure printing unit that includes an ink roll and a design roll. However, contact printers require a new design roll for each new logo, and due to contact between the roll and the article, the positioning of the articles can be upset. Non-contact printers such as ink jet printers have also been used, but these may be associated with clogging and insufficient drying time between operations if multiple operations, e.g., multiple colors, are to be serially registered.

Other non-contact printers include the use of a laser to etch a logo, such as disclosed in WO 91/01884, which is directed to a two-step branding apparatus in which a printer 35 prints a solid rectangular block which is then subsequently subjected to a laser etching step, whereby portions of the ink coating just applied by the printer 35 are removed to define a desired symbol and/or alphabetic and/or numeric characters, such as "MOTRIN". However, the laser is conventional in that it uses a mask in order to create markings on the pellet shaped articles.

Therefore, a need has developed in the art to address the drawbacks and/or inadequacies of the systems described above.

SUMMARY OF THE INVENTION

One aspect of the invention relates to a method and apparatus for processing and/or inspecting a plurality of pellet-shaped articles in an efficient and reliable manner.

Another aspect is to provide a laser unit for marking pellet-shaped articles as they are conveyed. The laser unit includes a laser and a galvanometer assembly, which assembly does not necessarily include a mask as is used in prior art laser systems. The laser unit can be used to laser drill holes, and/or laser etch and/or laser print logos and/or alpha numeric characters.

According to one embodiment of the invention, there is provided a system for processing and inspecting pellet-shaped articles, comprising a conveyer to convey the plurality of pellet-shaped articles along a transport path, wherein each of the pellet-shaped articles includes a first side and a second side, the conveyer having a plurality of article receiving recesses configured to convey the pellet-shaped articles such that either the first side or the second side of the pellet-shaped articles is randomly exposed in the recesses; a first processing unit configured to perform a first process only on the pellet-shaped articles having the first side exposed; a transfer unit having a plurality of article receiving recesses that receive the pellet-shaped articles from the first processing unit in such a manner that the exposed side of all of the pellet-shaped articles is reversed; and a second processing unit downstream from the transfer unit configured to perform a second process only on the pellet-shaped articles with the second side exposed. The conveyer may be a drum printer or a ramp feed printer.

According to another embodiment of the present invention, there is provided a three-drum system for processing and inspecting pellet-shaped articles (e.g., tablets or lentil-shaped masses), comprising a feed drum to convey the plurality of pellet-shaped articles along a transport path, wherein each of the pellet-shaped articles includes a first side and a second side, the feed drum having a plurality of article receiving recesses configured to convey the pellet-shaped articles in a manner that either the first side or the second side of the pellet-shaped articles is randomly exposed in the recesses; a first processing drum, extending generally tangentially to the feed drum, to receive the pellet-shaped articles from the feed drum, the first processing drum being associated with a first processing unit configured to perform a first process only on the pellet-shaped articles having the first side exposed; a second processing drum, extending generally tangentially to the first processing drum, that receives the pellet-shaped articles from the first processing drum in such a manner that the exposed side of all of the pellet-shaped articles is reversed, the second processing drum having a second processing unit configured to perform a second process only on the pellet-shaped articles with the second side exposed.

According to yet another embodiment of the present invention, there is provided a method for processing pellet-shaped articles, comprising conveying the plurality of pellet-shaped articles along a transport path, wherein each of the pellet-shaped articles includes a first side and a second side, the conveyer having a plurality of article receiving recesses configured to convey the pellet-shaped articles such that either the first side or the second side of the pellet-shaped articles is randomly exposed in the recesses; performing a first process only on the pellet-shaped articles having the first side exposed; manipulating the pellet-shaped articles and/or the conveyer such that the exposed side of all of the pellet-shaped articles is reversed; and performing a second process only on the pellet-shaped articles with the second side exposed.

The first and second processes may include laser printing, laser etching and/or laser drilling.

According to another embodiment of the present invention, there is provided an apparatus for marking pellet shaped articles, comprising a conveyer to convey the plurality of pellet-shaped articles along a transport path; a laser to generate at least one beam to print or etch information on one or more of the pellet-shaped articles, wherein the information includes at least one of alphabetical characters, numeric characters, and/or logos; and a galvanometer to control x and y or x, y and z coordinates of the beam of the laser relative to the transport path to align the laser beam with the one or more of the pellet-shaped articles.

According to still another embodiment of the present invention, there is provided a method for marking pellet shaped articles, comprising conveying the plurality of pellet-shaped articles along a transport path; generating at least one laser beam to print or etch information on one or more of the pellet-shaped articles, wherein the information includes at least one of alphabetical characters, numeric characters, and/or logos; and controlling x and y or x, y and z positions of the laser beam relative to the transport path to align the laser beam with the one or more of the pellet-shaped articles.

According to yet another embodiment of the invention, there is provided an apparatus for marking pellet-shaped articles, comprising a conveyer to convey the plurality of pellet-shaped articles along a transport path; a movable support configured to move parallel to the transport path at the same speed as the pellet-shaped articles as they are processed; and at least one laser marking unit mounted to the movable support so as to face the pellet-shaped articles, said laser marking unit having a laser beam generator and a 3-axis beam scanner to control output coordinates of at least one laser beam, said laser marking unit being configured to generate the at least one laser beam to print or etch information on one or more of the pellet-shaped articles, wherein the information includes one or more alphabetical characters, numeric characters, and/or logos, and said marking unit being structured to control the x and y or the x, y and z coordinates of the laser beam to align the beam with one or more of the pellet-shaped articles.

According to yet another embodiment of the invention, there is provided a system for marking pellet shaped articles, comprising a conveyer to convey the plurality of pellet-shaped articles along a transport path, an integrated laser/galvo marking head unit to generate a laser beam to print or etch information on one or more of the pellet-shaped articles, wherein the information includes at least one of alphabetical characters, numeric characters, and/or logos, and a laser/galvo controller to process and communicate information to the laser/galvo marking head unit to control the x,y or the x,y,z coordinates of the laser beam relative to the transport path to align the beam with the surface of one or more of the pellet-shaped articles.

According to yet another embodiment of the invention, there is provided an apparatus for conveying pellet shaped articles, comprising a conveyer to convey the plurality of pellet-shaped articles along a transport path, a movable support configured to move parallel to the transport path at the same speed as the pellet-shaped articles as they are processed, and at least one laser marking unit mounted to the movable support so as to face the pellet-shaped articles, said laser marking unit having a laser beam generator and a 3-axis beam scanner to control output coordinates of at least one laser beam, said laser marking unit being configured to generate the at least one laser beam to print or etch information on one or more of the pellet-shaped articles, wherein the information includes one or more alphabetical characters, numeric characters, and/or logos, wherein said marking unit is structured to control the x and y or the x, y and z coordinates of the laser beam to align the beam with one or more of the pellet-shaped articles.

According to yet another embodiment of the invention, there is provided a method of marking a plurality of edible pellet shaped articles, comprising conveying the pellet shaped articles along a transport direction, each of the pellet shaped articles comprising a coating and two or more layers beneath the coating which have different colors and/or characteristics, and lasering the pellet shaped articles with at least one laser beam so as to reveal at least part of each of the two or more layers, so as to create a multi-colored/textured design on the pellet shaped articles.

Other aspects, features, and advantages of this invention will become apparent from the following detailed description when taken in conjunction with the accompanying drawings, which are a part of this disclosure and which illustrate, by way of example, principles of this invention.

BRIEF DESCRIPTION OF THE DRAWINGS

The accompanying drawings facilitate an understanding of the various embodiments of this invention. In such drawings.

DETAILED DESCRIPTION OF ILLUSTRATED EMBODIMENTS

1.0 Drum Printer

Figure 1:
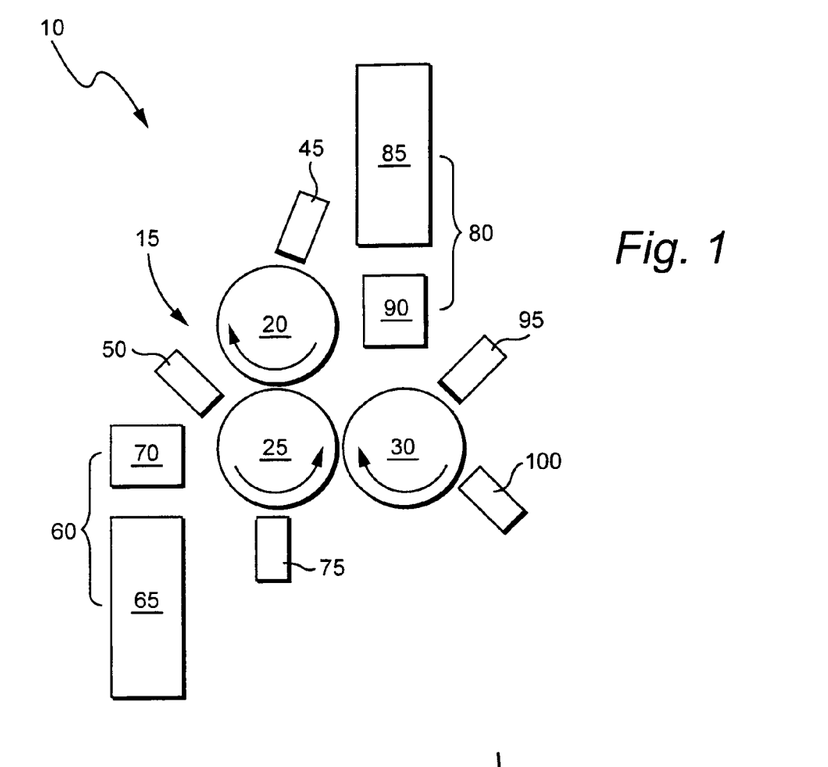
FIG. 1 is schematic view of a three drum printer according to an embodiment of the invention.

FIG. 1 illustrates a servo drum printing system 10 according to an embodiment of the present invention. The system 10 includes a conveyer 15 in the form of a three-drum printer that rotates in the directions indicated by the arrows on the drums. The three drums include a feed drum 20, a first processing drum 25 in the form of a first print drum and a second processing drum 30 in the form of a second print drum.

Product in the form of pellet shaped articles, e.g., pharmaceuticals or confections, are provided to the feed drum in a random order. In one example, the product is a tablet or is generally lentil shaped, including a first side that is face down on the feed drum, and a second side that faces away from the feed drum, such that the second side is exposed for processing. Other ones of the articles are positioned such that the second side is face down and the first side is exposed, i.e., the articles are said to be provided to the feed drum in "random" order since some of the articles in the feed drum have the first side exposed and others in the feed drum have the second side exposed. The articles are positioned within the recesses on the drums in a consistent (non-random) manner, although either the first side or the second side may be exposed.

Figure 2:
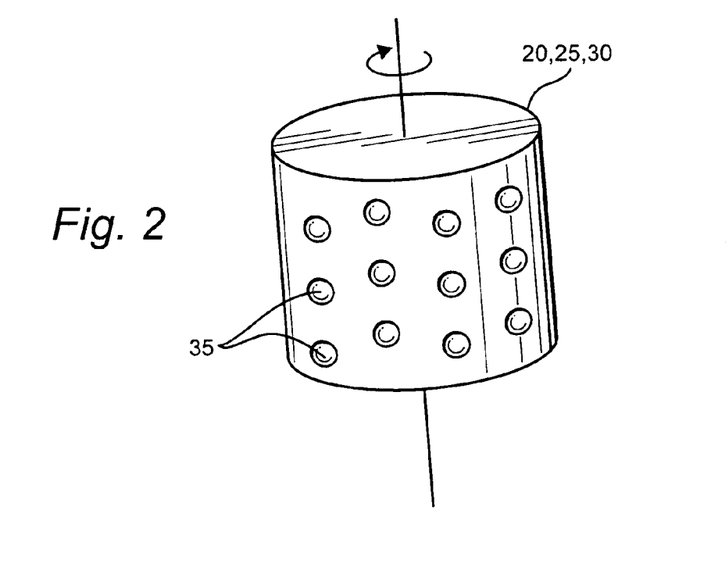
FIG. 2 is a schematic perspective view of a sample drum with recesses according to an embodiment of the present invention.

As shown in FIG. 2, each of the drums includes a plurality of recesses 35 that receive the pellet-shaped articles, and typically, each drum is provided with at source of vacuum pressure to keep the pellet-shaped articles in the recesses. The vacuum pressure is applied to only a portion of each drum, such that the pellet-shaped articles are released at the proper positions.

Pellet-shaped articles from the feed drum 20 are transferred to the first print drum 25 so that the pellet-shaped articles are reversed, turned over or flipped. Thus, if the first side of the pellet-shaped articles was exposed on the feed drum 20, the second side of the pellet-shaped articles is exposed on the first print drum 25. If the second side of the pellet-shaped articles was exposed on the feed drum 20, after transfer, the first side of the pellet-shaped articles is exposed on the first print drum 25. Similarly, pellet-shaped articles from the first print drum 25 are transferred to the second print drum 30 so that the pellet-shaped articles are once again reversed, turned over or flipped.

In operation, system 10 will feed a plurality of pellet-shaped articles in the feed drum 20. The pellet-shaped articles will then be inspected by a drum inspection unit 45 for one characteristic, such as a particular color. In one example, the articles are tablets that deliver a drug on a time-release basis. Such tablets include a first side having a drug and a second side which is sometimes referred to as a "push" layer. The first side with the drug needs to be provided with one or more holes, such that the drug can be released. The "push" layer helps to push the drug out of the tablet once fluids from the digestive track enter the drug side of the tablet via the one or more holes.

The tablet may include two or more drugs that need to be released at different times, which can be accomplished by providing holes of different depth and/or width. A laser unit which easily allows for this is discussed below.

The time-release will not work, or will not work properly, unless the one or more holes is provided on the drug side. Thus, it is necessary to ensure that the drug side is exposed for processing, such as laser drilling. The drug side is more easily identified if it has a characteristic feature. In the present example, the characteristic feature is that the drug side has a specific color.

The pellet-shaped articles will then be transferred to the first print drum 20. In the process of being transferred, the articles are turned over to allow processing to occur on the opposite side. The pellet-shaped articles are then inspected by an inspection unit 50 for a second characteristic, such as a particular color. The pellet-shaped articles will then be altered by a first laser unit 60 including a laser 65 controlled by a galvanometer 70 ("galvo"). One example of a suitable laser is the Universal Laser. Model No. UL-60-0EM (a 60 W $CO_2$ laser). One example of a suitable galvo is a 10 mm X+Y flat field galvo with ScribeSmart™ (No. E00-7010272), available from GSI Lumonics. The pellet-shaped articles may be altered by drilling one or more holes through a coating of the pellet-shaped articles. Alternatively, the alteration may take the form of etchings or markings on the surface of the articles, without completely passing through the coating. Examples of suitable integrated laser/galvo marking head units are the Keyence 3-Axis $YVO_4$ MD-V9900 series (8 W), Keyence 3-Axis $CO_2$ ML-Z series (30 W), and Keyence $CO_2$ ML-G series (30 W).

The pellet-shaped articles may also be altered to laser print the surface of the product. When drilling laser holes for time-release purposes, the laser usually has a power rating of 30 W or more, as laser drilling through the coating of the product generally requires a power range of 30-60 W. However, laser printing and etching can be achieved with a laser power rating of 30 W or less, as the laser is intended to change or react with the color of the surface, or to etch thin layers of coating to reveal one or more different colored/textured layer(s).

The pellet-shaped articles are inspected by an inspection unit 75 for a particular characteristic, which may be a laser hole or a laser printed/etched logo. The pellet-shaped articles are then transferred to the second print drum 30 and, in the transfer process, turned over again to allow more operations to occur on the first side. The pellet-shaped articles will then be altered (e.g., laser holes and/or laser printing/etching) by a second laser unit 80 including a second laser 85 controlled by a second galvo 90. The laser and galvo may be separate components, or integrated together in one marking head unit, such as the case, for the Keyence models described earlier. The pellet-shaped articles are then inspected by an inspection unit 95 for a particular characteristic, which may be a laser hole or a laser printed/etched logo.

In the embodiment of FIG. 1, a total of four inspection units are provided, 45, 50, 75 and 95. It may be possible to eliminate either the drum inspection unit 45 or inspection unit 50 associated with the first processing drum 20. Inspection unit 50 can be eliminated if it is assumed that the pellet-shaped articles are successfully transferred from the feed drum 20 to the first processing drum 25, i.e., all articles having the first side exposed on the feed drum will have the second side exposed on the first print drum. Drum inspection unit 45 can be eliminated it is not necessary to inspect the articles on the feed drum 20.

In addition, while two laser units are shown, each having a galvo and each having a laser, it is also possible that the laser units could share one or more components. For example, a single laser unit could be used to drill a hole or laser print or etch both sides of the articles when and as the first and second sides, respectively, are exposed on the first and second print drums 25, 30, e.g., by appropriately configuring the overall arrangement. In another alternative, two lasers could share a common galvo, or a single laser could be controlled by two or more galvos, with appropriate timing.

The pellet-shaped articles are brought past an ejection system 100 where acceptable or "good" pellet-shaped articles are then ejected into a discharge chute. Only pellet-shaped articles that have met the particular characteristics will be ejected into the discharge chute, as disclosed in U.S. published patent application no. US-2004-0094050 A1, incorporated herein by reference in its entirely.

1.1 Applications

Using the system described above, the following applications are possible:

First, laser drill one side of a plurality of pellet shaped articles. Because the articles are oriented in a random order, the first laser unit 60 may act on the first side of some of the articles on the first print drum 25, while the first side of the remaining articles is acted on by the second laser unit 80, depending on whether the side to be processed is exposed on the first or the second drum.

Second, laser drill both sides of a plurality of pellet-shaped articles. If both sides of the articles require the same laser drilled holes, then the first laser unit 60 can provide the holes to all of the articles on the first print drum 25, regardless of whether the first or second side of the articles is exposed. The articles will then be transferred to the second print drum 30 whereupon the second laser unit 80 will laser all of the articles, regardless of which side is exposed. However, if different hole characteristics are required for the first and second sides of the articles, then it is preferable that the first laser unit 60 drill only on those articles having the specified side exposed, and the second laser unit 80 drill only on the other side. It may also be possible to laser drill one side, and to laser etch/print on the other side.

Third, laser drill only one side of a plurality, of pellet-shaped articles. The side that receives processing can be selected based on a particular characteristic of the tablet, e.g., a color or some other characteristic like a "Near-Infrared signature". In one example, the first laser unit 60 operates on some of the articles having the desired side exposed, while the second laser unit 80 operates on the remainder of the articles when the desired side is exposed on the second drum 30.

Fourth, laser print/etch one side of a plurality of pellet-shaped articles. Such laser printing can occur on all of the articles at either the first or the second drum, or on some of the articles at the first drum 25 and the remainder of the articles at the second drum 30, depending on whether the desired side is exposed at the first or the second print drum.

Fifth, laser print/etch both sides of a plurality of pellet-shaped articles, much like the laser drilled holes are provided, as described above.

Sixth, laser print/etch only one side of a plurality of pellet-shaped articles, based on a particular characteristic of the tablet, such as a color or some other characteristic like a "Near-Infrared signature".

Each galvo 70, 90 can control a laser beam from the respective laser 65, 85 to drill multiple tablets across a row in a drum. This allows for much higher usage of the laser unit power and increased throughput for the same amount of laser power.

Stated differently, the speed of a laser for most laser drilling and some laser printing/etching applications, can be significantly higher than the rate at which the pellet-shaped articles can be handled. Using a single stationary mounted galvo unit to process multiple pellet-shaped articles positioned within a row of recesses on the drum improves the efficiency of the system and the throughput of the laser.

Further, system 10 can be programmed for different size holes and different logos and/or alpha numerics. This allows product change-over in less time because there are no design rollers or laser masks to be replaced or changed over.

2.0 Ramp-Style Conveyers

Figure 3:
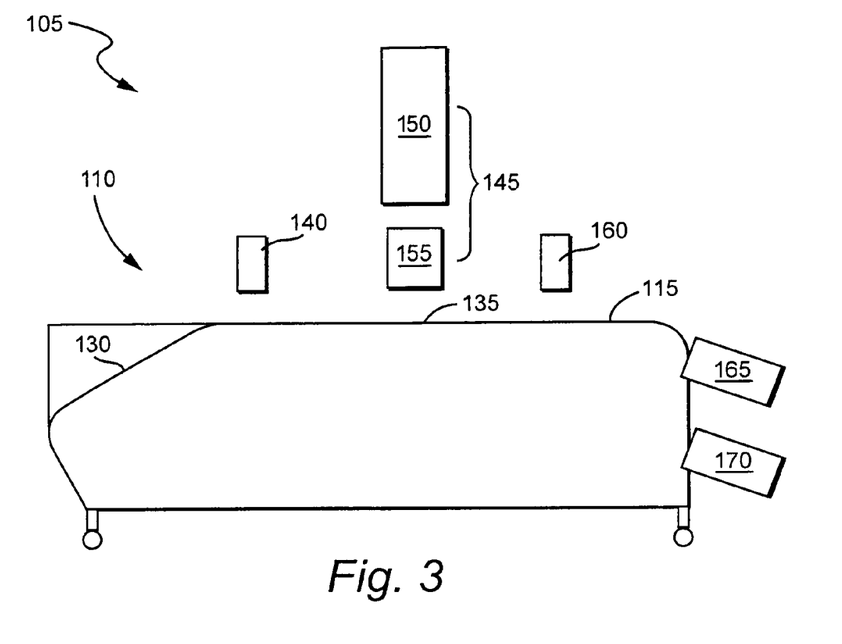
FIG. 3 is a schematic view of a ramp-type printer according to another embodiment of the present invention.

The system 10 described in relation to FIG. 1 uses a conveyer 15 in the form of a "drum" printer. However, the conveyer 15 may take alternate forms. For example, as shown in FIG. 3, system 105 may include a conveyer 110 in the form of a ramp printer, the overall architecture is known from U.S. Pat. No. 5,433,146, incorporated herein by reference in its entirety.

FIG. 3 is a schematic diagram of a ramp-type conveyer 110 including an endless conveyer loop 115 including a plurality of carrier bars 120 (FIG. 4) each having a plurality of recesses 125. The conveyer 110 includes an inclined or ramped section 130 and a generally horizontal section 135. The inclined section 130 is provided with a hopper that is filled with a plurality of pellet-shaped articles or other product. The horizontal section 135 includes one or more processing stations or units, e.g., printing, inspecting, laser drilling, etc.

Conveyer 110 will feed product in the inclined ramp feed section 130, e.g., via the hopper. The product will then be inspected by an inspection unit 140 for a particular characteristic, e.g., a particular color. The product will then be altered by a laser unit 145 including a laser 150 controlled by a galvo 155. The laser and galvo may be separate components, or integrated together in one marking head unit. The product may be altered to drill one or more holes through the coating of the tablet. The product may also be altered to laser print/etch the surface of the product.

The product is then inspected by an inspection unit 160 for a particular characteristic, e.g., a laser hole or a laser printed logo and/or alpha numerics. The product is then brought past an ejection unit 165 where good or acceptable product is then ejected into a discharge chute, as described above. Only product that has been judged to have predetermined criteria will be ejected into the discharge chute. Any product that has not met the predetermined criteria will not be ejected into the discharge chute. In this case, the "rejected" or unacceptable articles can be collected by gravity in a "reject" bin 170.

2.1 Possible Applications

Using the system described above, the following applications are possible:

First, laser drill one side of a pellet shaped article (pellet-shaped articles).

Second, laser print/etch one side of the pellet-shaped articles.

Figure 4:
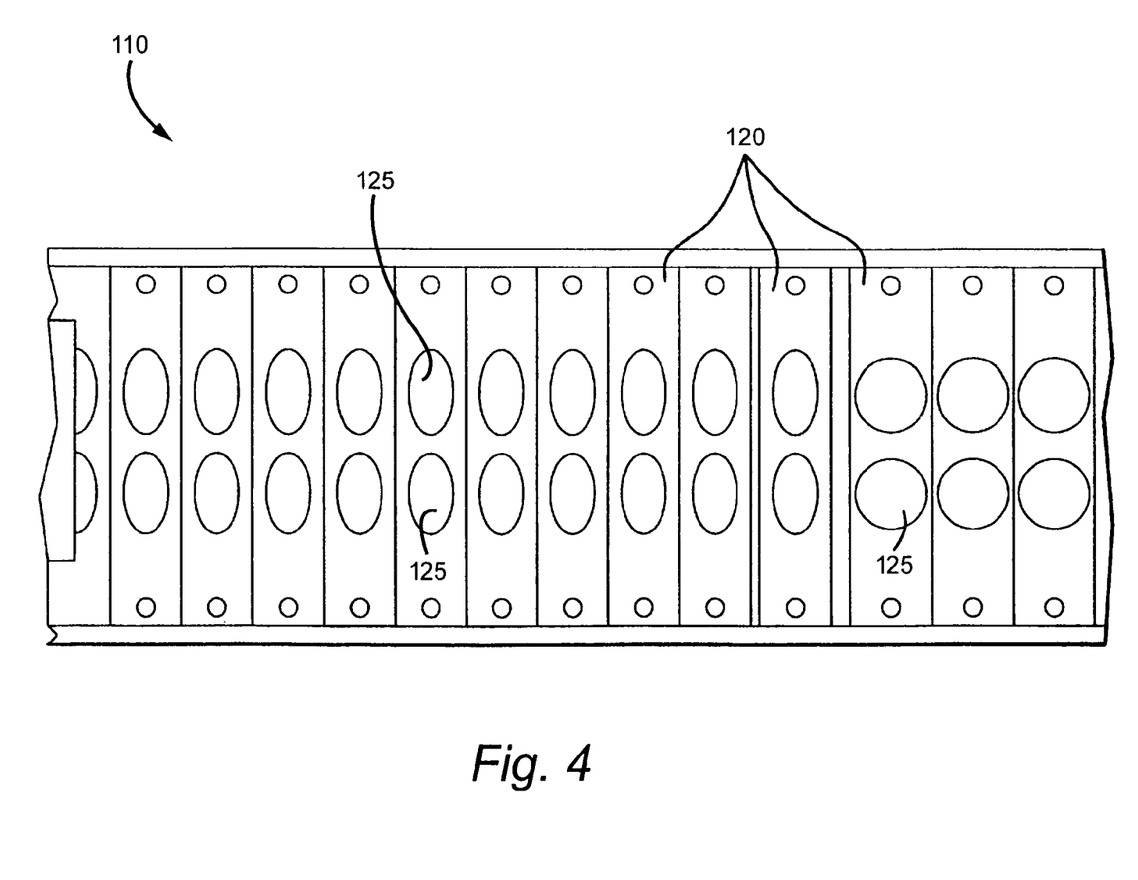
FIG. 4 is a schematic view of a portion of a ramp-type conveyer with carrier bars having recesses according to an embodiment of the present invention.

A single stationary mounted galvo unit can process multiple pellet-shaped articles positioned within a row of recesses on a carrier bar. This allows for much higher usage of the laser system power and increased throughput for the same amount of laser power.

Further, the galvo/laser controller can be programmed for different logos and/or alpha-numerics. This allows product change-over in less time because there are no design rollers or laser masks to be replaced or changed over.

2.2 Multi-faceted Processing and Inspection

Figure 5:
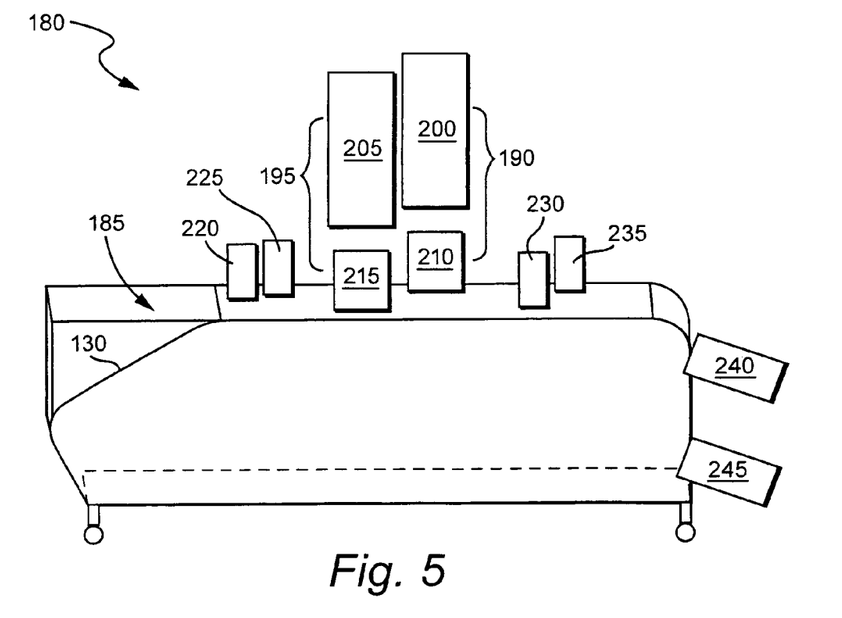
FIG. 5 is a schematic view of a ramp-type printer according to still another embodiment of the present invention.

FIG. 5 is a schematic diagram of a pellet-shaped article processing system 180 having a ramp-style conveyer 185 like that described above in relation to FIG. 3, but includes multiple laser units 190, 195, each unit including a laser 200, 205 and a galvo 210, 215 or multiple integrated laser/galvo marking head units to help increase throughput. Further, each laser unit 190, 195 may provide different operations, e.g., one for laser drilling and one for laser printing and/or etching. System 180 may also include multiple inspection units 220, 225 upstream of the laser units 190, 195. Units 220, 225 can check for common or different characteristics. Similarly, multiple inspection units 230, 235 can be positioned downstream of the laser units 190, 195, to check on the quality of the processing of the articles. An accept bin 240 and a reject bin 248 may also be provided, as described above.

2.3 Moving Support for Laser-Galvo Marking Head Processing System

Figure 15:
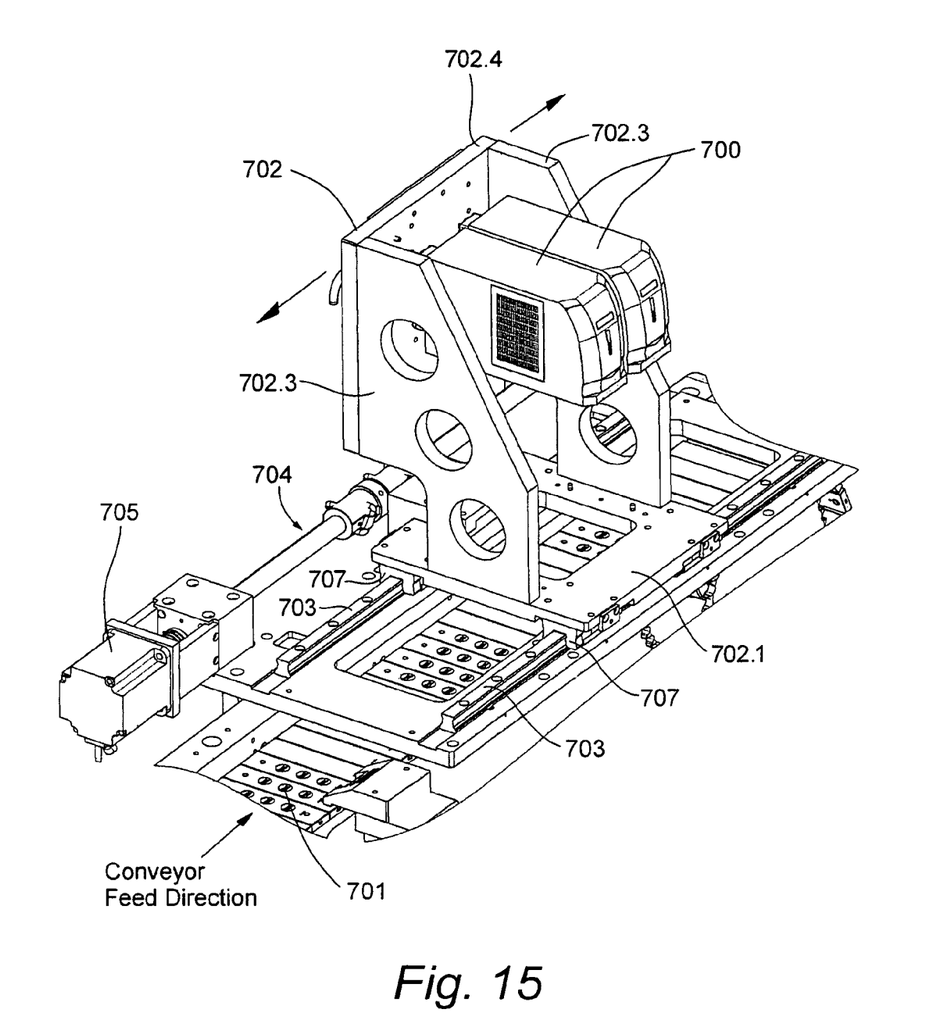
FIG. 15 is a drawing that illustrates a flat-bed/ramp-type conveyer with a movable support to support one or more laser-galvo marking heads according to an embodiment of the invention.
Figure 16:
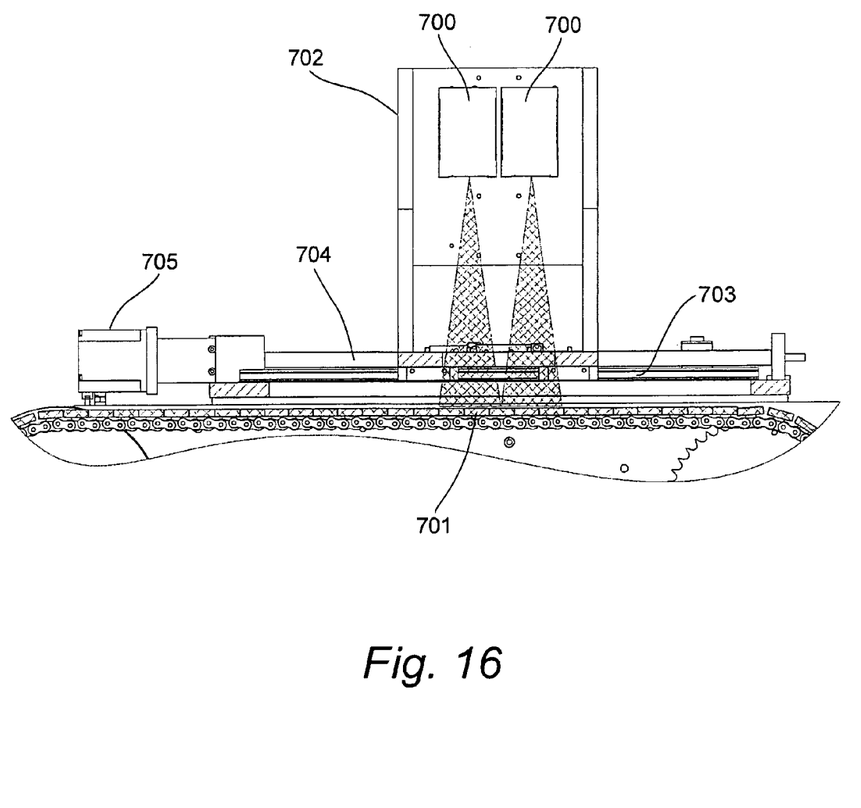
FIG. 16 is a cross sectional view of a flat-bed/ramp-type conveyer of FIG. 15.

FIGS. 15 and 16 illustrate a pellet-shaped article conveyer with one or more laser/galvo marking head units 700 mounted to a moveable support, e.g., a gantry 702. In this embodiment, two marking head units 700 are provided, although the support or gantry 702 could also support only a single head unit, or more than two head units. Gantry 702 includes a base 702.1 having an aperture 702.2 through which the articles are visible. One or more support walls 702.3 extend from the base 702.1, and a bridging wall 702.4 extends between support walls and supports the head units.

The conveyer is in the form of an endless loop (115, FIG. 3) that includes a plurality of carrier bars (120, FIG. 4) each having a plurality of recesses (125, FIG. 3). Each laser/galvo marking head unit is dedicated to process a unique area of the conveyer that contains multiple pellet-shaped articles positioned within rows of recesses across a set of carrier bars 701. The unique areas of the head units may be separate, or at least partially overlap. As stated earlier, the speed for laser drilling and laser printing/etching applications can be significantly higher than the rate at which the pellet-shaped articles can be handled. This is true for most cases, however, the time required for laser printing or etching complex images and logos can limit the rate at which the pellet-shaped articles can be conveyed past the laser/galvo system. To maximize the throughput of the system, the conveyer should preferably feed the pellet-shaped articles at the optimum product handling speed, regardless of the complexity of the desired laser printed image or logo.

To laser a complex logo, one or more laser/galvo marking head units 700, preferably 2 or more, are mounted above or adjacent the conveyer to the gantry 702, which runs parallel to the conveyer feed direction, e.g., using a set of linear bearing rails 703 provided on each side of the carrier bars 701. Bearing rails 703 cooperate with grooves 707 provided to the base 702.1. The linear, reciprocating motion of the gantry 702 is controlled independently of the conveyer by using a servo motor 705 and ball screw 704 drive system. The motion of the gantry can also be controlled using other type of equivalent drive systems used in the art such as linear belt drives. The movable support can take other forms, such as an endless belt which supports the laser units adjacent the conveyer. Other forms of non-reciprocating movable support are also possible.

The gantry servo motor 705 has an encoder to precisely position and speed synchronize the gantry relative to the pellet-shaped article conveyer drive system. As the conveyer feeds the pellet-shaped articles along or past the laser processing area, the gantry 702 begins at a stationary starting position. The motion controller commands the gantry servo motor 705 to rotate the ball screw 704, and hence drive the gantry in the same forward direction as the conveyer feed until the gantry forward movement speed is synchronized with the conveyer article transport speed. This creates a system where there is no relative motion between the laser/galvo marking heads and the pellet-shaped articles to be processed. Synchronization can also be achieved by temporarily locking (e.g., magnetically and/or mechanically) the movable support relative to the conveyer, and then unlocking them when forward motion is complete. This may involve providing the head units on a movable or telescoping structure to move towards and away from the conveyer.

The laser/galvo marking heads 700 begin processing their dedicated area (which may include the articles in one or more carrier bars as shown in FIG. 16) of the conveyer that contains multiple pellet-shaped articles positioned within rows of recesses across a set of carrier bars 701. When the system has completed the laser drilling, printing or etching of the articles, the gantry's forward movement is stopped and the servo motor 705 reverses the direction of the ball screw 704 to return the gantry 702 to the starting position. The gantry then remains stationary until the next set of pellet-shaped articles is conveyed into position, at which time the process is repeated.

Figure 6:
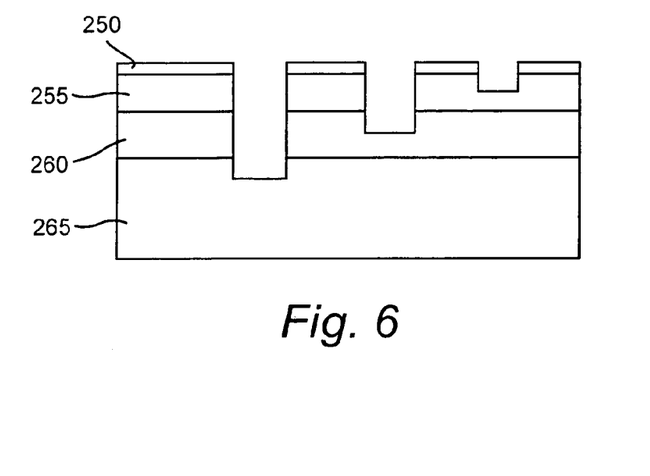
FIG. 6 is a schematic, cross-sectional view of a pellet-shaped article according to an embodiment of the present invention.

In one embodiment, the pellet-shaped articles may have multiple layers beneath the coating layer, with each layer displaying or revealing a different color depending on the laser depth and/or power, etc., of the laser beam For example, the pellet-shaped articles may have a cross-sectional configuration including a coating layer 250, a first color layer 255, a second color layer 260 and a medicine layer 265, as shown in FIG. 6. The first layer 255 will display a first color (or characteristic, e.g., texture) if lasered to that depth by the first laser unit, while the second layer 260 will display a second color if lasered to that depth by the second laser unit. In addition, the coating layer 250 and the medicine layer 265 can have different color appearances. This can be used for the production of pellet-shaped articles having a composite image including multiple colors.

Alternatively, multiple color pellet-shaped articles can be created using the same laser unit, e.g., by altering the depth and/or power of the single laser unit on different portions of the same pellet-shaped articles. The laser beam focal length of a single 3-Axis laser unit can be adjusted to etch to multiple depths, removing various layers of coating to reveal multiple colors.

2.4 Ramp Feed with Two-Sided Processing

Figure 7:
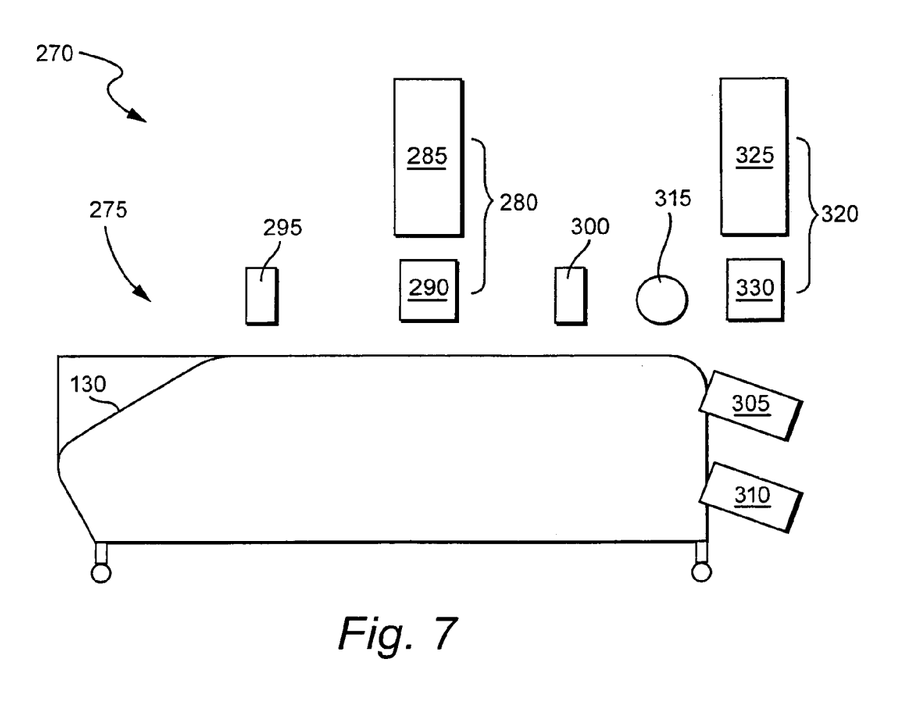
FIG. 7 is a schematic view of a ramp-type printer according to yet another embodiment of the present invention.

FIG. 7 is a schematic view of a system including a ramp-feed conveyer 275 as described in relation to FIG. 3, including a laser unit 280 with a laser 285 and galvo 290, inspection units 295, 300, an accept bin 305 and a reject bin 310. Further system 220 includes a transfer unit 315, e.g., a top pick-up unit, to expose the opposite side of the pellet-shaped articles that has not been processed upstream. This top pick-up unit is similar to that disclosed in relation to U.S. Pat. No. 5,878,658, incorporated herein by reference in its entirety. The top pick-up unit exposes the second side of the articles to a second laser unit 320, including a laser 325 and a galvo.

3.0 System Controller with Multi-Axis Motion Controller

Figure 8:
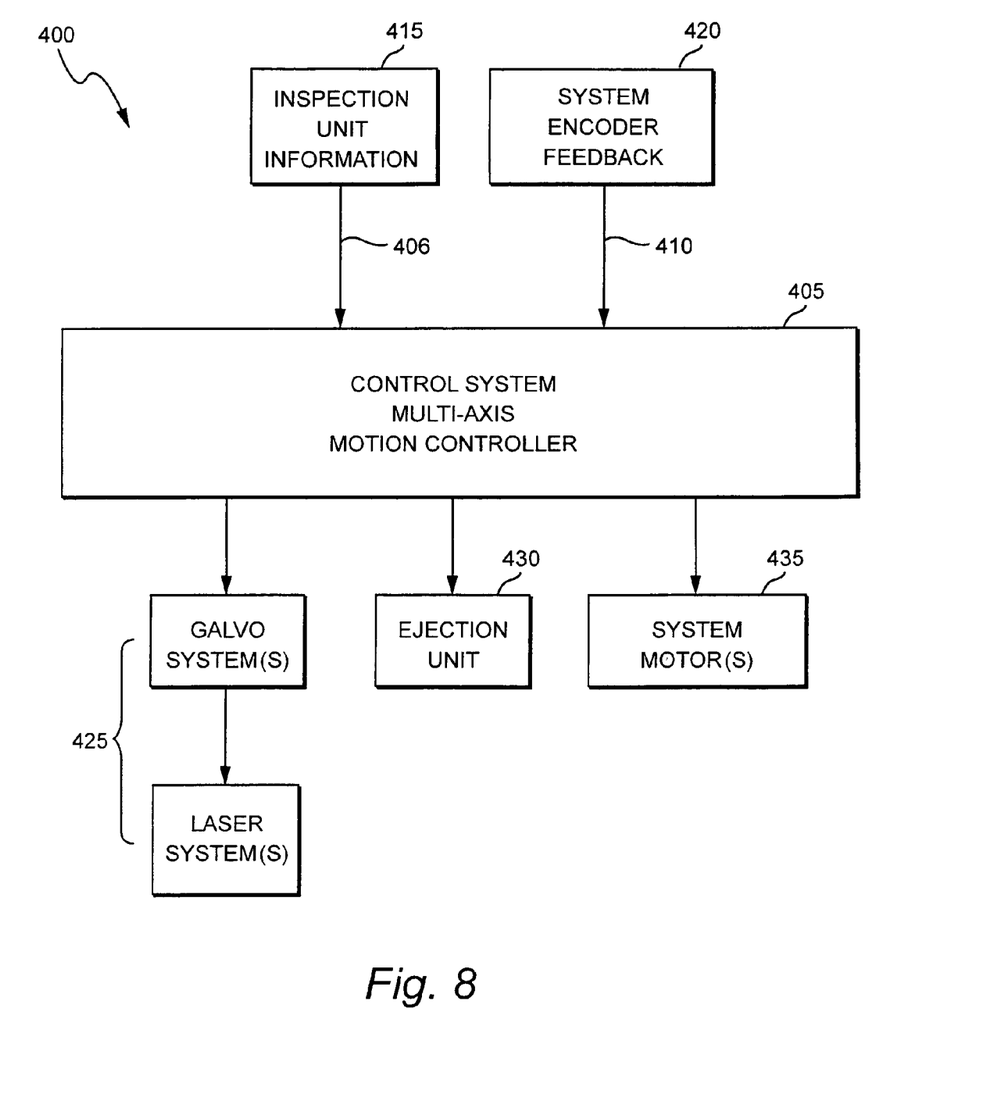
FIG. 8 is a schematic view of a control system according to an embodiment of the present invention.

FIG. 8 illustrates a schematic view of a control system 400 according to an embodiment of the present invention. The control system 400 includes a controller 405 that is provided with one or more input signals 406, 410, e.g., from each inspection unit 415 and a system encoder feedback 420 that monitors the rotational position of the motors, from which the position of the recesses in the feed processing drum or the carrier bars can be determined. Based on the input signals, controller 405 provides control signals to each laser unit 425, the ejection unit 430 and the system motors 435.

Each inspection unit 415 could be in the form of one or more simple photoelectric sensors or a more complicated a multi-camera PC based vision system. The inspection unit provides feedback to the controller based on the inspection data. This could be to provide information in regard to an upcoming operation. This could also be to verify that a previous operation occurred successfully and the pellet-shaped articles are acceptable to discharge.

The system encoder feedback 420 is provided to control the servo motors to accurately position the product for processing, e.g., laser drilling and/or printing/etching. The encoder feedback is used for accurate tracking of the tablets between successive operations. The encoder information is also used for the ejection unit 430 to discharge the good products.

The system motors 435 are used to drive the drums and/or carrier bars for feeding the product and conveying the product through various operations.

Each galvo of the laser unit is used to aim the laser beam to create a specific pattern for laser drilling, printing or etching. The laser/galvo controller is designed to receive encoder position information from the system controller 405. This allows the galvo to control the output coordinates of the laser beam to laser drill, print or etch product while it is moving. This helps to increase throughput. The galvo controller provides a trigger signal to fire the laser as well. The laser system provides the optical beam power for laser drilling, printing or etching.

The galvanometer uses an encoder for feedback on the target position. Once the galvo starts firing the laser in a pattern of holes, the encoder feedback is used to move the beams directing the laser so that the beams stay focused properly on the pellet-shaped article, e.g., tablet, caplet or capsule. The galvo controller provides a trigger signal to the laser. This is efficient because the galvo can fire the laser immediately after the mirrors are in position to do so. This also improves the efficiency of the machine and the throughput of the system per laser.

Controller 405 can be used with any of the embodiments described above, it can take the form of a general purpose computer, or it may be a dedicated laser/galvo controller specifically designed for the laser marking head unit, as in the controller for the Keyence units specified earlier.

4.0 Laser Drill Hole Drilling Operations

FIGS. 9-13 schematically illustrate options for drilling holes using the laser unit described above. A typical laser drilling system uses either a mask or a fine focus head to adjust the size of the single laser hole. The laser may be pulsed multiple times to create the proper depth of the hole.

Figure 9:
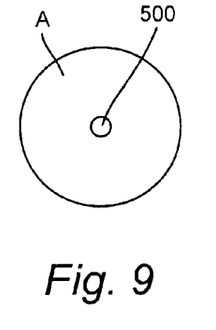
FIGS. 9-13 illustrate laser drilled holes according to alternative embodiments of the present invention.
Figure 10:
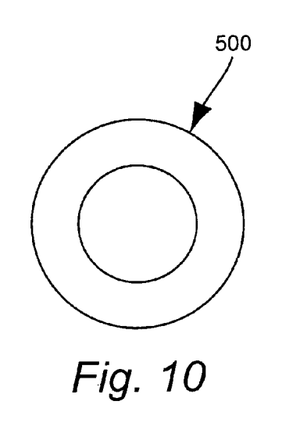
Figure 11:
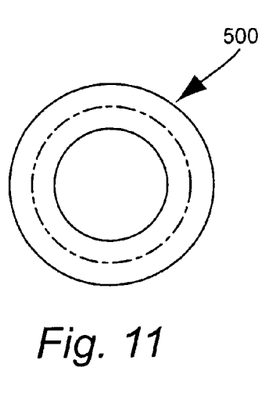

As described in relation to U.S. Application Publication no. US-2004-0094050-A1, one example of an article A is shown by FIG. 9. Article A may be round, although the article could be a caplet as well. The article A has a depth, diameter and shape which may vary. The article A is provided with a laser hole 500, which is shown on an enlarged scale in FIG. 10. The diameter of the hole 500 is designed to be greater than about 800 micrometers or greater, e.g., between minimum and maximum values, such as about 3 mm-6 mm, or about 5-10 times the size of the hole diameter in prior art systems. The depth of the hole is typically in the range of about 450-500 micrometers. The depth of the hole is at least equal to and preferably greater than the thickness of the coating to achieve the desired effect. The depth is controlled by pulsing the laser at least one time, and preferably multiple times in the same position until the depth is proper.

Figure 12:
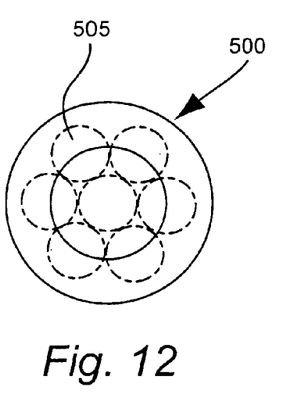
Figure 13:
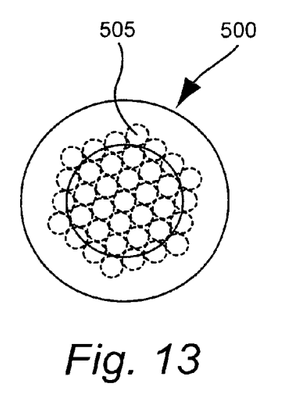

In a first mode (FIG. 11), the diameter of the holes is controlled by using the laser to create holes having a diameter in the range of 400-800 micrometers. However, in a second mode, the laser according to one embodiment is controlled by creating a series of holes in a predetermined pattern, as shown in FIGS. 12 and 13. In FIGS. 12 and 13, a large diameter hole, e.g., greater than 800 micrometers, preferably about 3-6 mm, is created by pulsing the laser with smaller diameter holes 505 in different positions to create the large diameter hole. In FIG. 12, the pattern includes seven holes in the general shape of a hexagon, while FIG. 13 shows the pattern to include many more smaller holes, e.g., 37 holes with 4 on each side of a generally hexagonal shaped hole. In general the number and size of the holes and the pattern size and shape may vary to create the desired hole diameter. Changing the hole diameter and/or depth affects the surface area of the article exposed to the fluids in the digestive tract, which may be used to better control the release of the medicine. In other words, one inventive concept extends to increasing the surface area exposed to the fluid in the stomach, regardless of how the increased surface area is achieved. The increased surface area may be uniform or non-uniform cross section. Increased surface area may be achieved via larger drilled holes, or by etching away a portion of the coating using the laser, for example.

The galvo has two mirrors mounted to high performance servo motors for controlling the x and y coordinates of the laser beam, and may contain a Z-axis scanner to adjust the focal length (z coordinates) of the laser beam. The laser coordinates are controlled by the mirror positions. The laser/galvo controller determines the mirror and laser focal length positions.

In one aspect of the invention the galvo is commanded to point the laser at the center of the tablet and then the controller fires the laser for a set period of time. This period of time combined with the laser pulse width and pulse period will determine the hole depth. For example, each product may be in the vicinity of the laser for a total time of about 50-300 milliseconds (ms), preferably about 100-200 ms, and most preferably 150 ms, depending on the product involved. In that time, the pulse period may be about 400-600 microseconds, e.g., about 500 microseconds, in which the product can be lasered. The pulse width may be about 40-60 microseconds, e.g., about 50 microseconds. In that pulse width, the product may be pulsed 7-8 times to create the proper depth, although the correct depth may be achieved with a single pulse, or more than 7-8 pulses.

In another aspect of the invention, the galvo will be commanded to perform a complex series of moves, while at the same time electronically gearing to the conveyer. The controller will command the laser to fire at the appropriate times. The depth of the hole is determined be laser pulse width, pulse period and galvo speed. The diameter of the hole is determined by the software in the controller 400.

In another aspect of the invention, the laser/galvo controller can vary the spot size of the laser beam to create larger diameter and/or deeper holes in the product.

One advantage of these systems is that the same laser can be used to create holes having a diameter in the range of approximately 400 micrometers to 6 millimeters. This avoids the need to switch lasers or to buy lasers with a large diameter, which can be expensive.

The laser can also be used to rapidly drill holes on a plurality of rows of articles across a wide processing area, e.g., 1 or more carrier bars, such as 2-5 carrier bars. The range of motion for the galvo is such that it is able to point at multiple products across the conveyer bed. For example, the laser can be fired at 6 discrete products with ⅝" spacing between the products. The galvo can be commanded to point at each product in sequence and then fire the laser at each.

Laser Print Example

Figure 14:
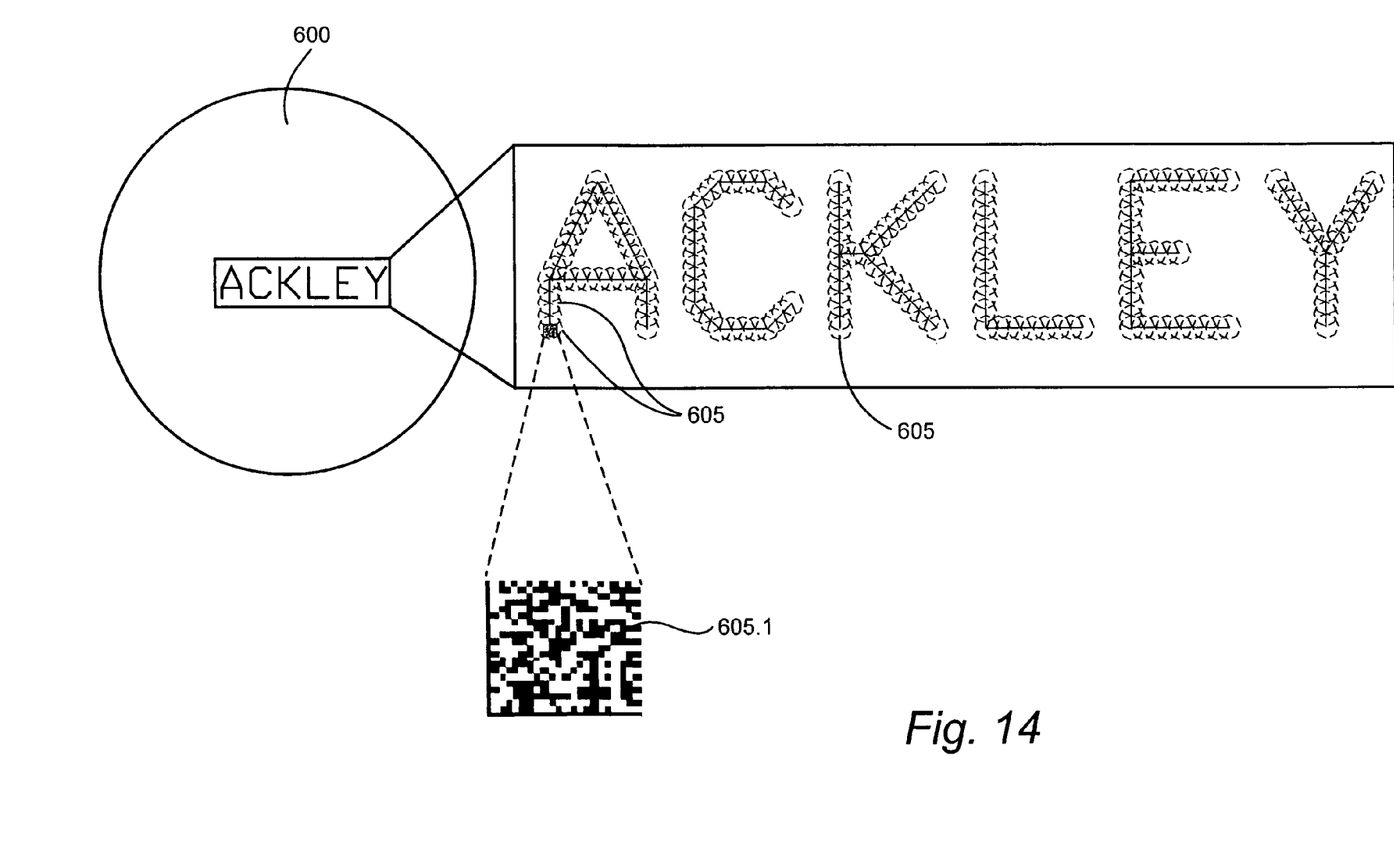
FIG. 14 is a schematic view of a tablet with laser engraving, printing/etching performed according to an embodiment of the present invention.

FIG. 14 schematically illustrates a pellet-shaped articles 600 in the form of a round or lentil shaped product, that is subjected to laser printing according to an embodiment of the present invention. In this example, article 600 includes a company brand, "Ackley". The brand is enlarged in FIG. 14, adjacent the article 600, to better demonstrate the lasering.

A typical laser printing system uses a mask to create the printed logo on the product. Only a single product can be laser printed at a time. Changing the logo requires changing the mask.

The laser printing system according to an embodiment of the present invention utilizes a pattern of small shallow circular incisions (holes) 605 on the surface of, through or partly through the top layer of coating to engrave the printed logo. A continuous wave or high laser pulse frequency is used; therefore adjacent holes are at least partially overlapping. As mentioned earlier, the power (e.g., 30 W or less) of the laser for printing and etching may be significantly less than the power (e.g., 30 W or more) required for laser drilled holes (e.g., for time-release purposes). There are again an infinite number of logos that can be printed. The pattern is programmable so no change-over of a mask is required.

The printed logo can include alpha-numeric characters, logos, or other images. The printed logo could even be some type of machine readable code like a UPC or 2D Data Matrix code. For example, as shown in FIG. 14, one or more of the laser holes in the logo name could include a machine readable code 605.1. The machine readable code could also include one or more of the codes as described in PCT application no. PCT/US2005/020860, incorporated herein by reference in its entirety. The code could be configured to include a Lot Code, Date Code or other batch related information.

The printed logo could also include a serial number which would be incremented automatically during the production run to serialize the product being printed.

While the invention has been described in connection with what are presently considered to be the most practical and preferred embodiments, it is to be understood that the invention is not to be limited to the disclosed embodiments, but on the contrary, is intended to cover various modifications and equivalent arrangements included within the spirit and scope of the invention. Also, the various embodiments described above may be implemented in conjunction with other embodiments, e.g., aspects of one embodiment may be combined with aspects of another embodiment to realize yet other embodiments.

What is claimed is:

1. A system for marking pellet shaped articles, comprising:
a conveyer to convey the plurality of pellet-shaped articles along a transport path;
a laser to generate at least one beam to print or etch information on one or more of the pellet-shaped articles, wherein the information includes at least one of alphabetical characters, numeric characters, and/or logos, and wherein the information comprises at least one engraving; and
a controller to control x and y or x, y and z coordinates of the beam of the laser relative to the transport path to align the beam with the one or more of the pellet-shaped articles.

2. A system according to claim 1, wherein the conveyer includes a plurality of rows having a plurality of recesses provided therein, and the laser and/or controller is configured to simultaneously laser multiple ones of said pellet-shaped articles in a common row.

3. A method for marking pellet shaped articles, comprising:
conveying the plurality of pellet-shaped articles along a transport path;
generating at least one laser beam to print or etch information on one or more of the pellet-shaped articles, wherein the information includes at least one of alphabetical characters, numeric characters, and/or logos, and wherein the information comprises at least one engraving; and
controlling x and y or x, y and z coordinates of the beam of the laser relative to the transport path to align the beam with the one or more of the pellet-shaped articles.

4. A method according to claim 3, wherein the pellet shaped articles include a coating and two or more layers below the coating, each having a different color/characteristic/texture and the method comprises controlling the beam depth to expose a portion of each of the layers, thereby defining a composite pattern.

5. A system for marking pellet-shaped articles, comprising:
a conveyer to convey the plurality of pellet-shaped articles along a transport path;
an integrated laser/galvo marking head unit to generate a laser beam to print or etch information on one or more of the pellet-shaped articles, wherein the information includes at least one of alphabetical characters, numeric characters, and/or logos, and wherein the information comprises at least one engraving; and
a laser/galvo controller to process and communicate information to the laser/galvo marking head unit to control the x, y or the x, y, z coordinates of the laser beam relative to the transport path to align the beam with the surface of one or more of the pellet-shaped articles.

6. A system according to claim 5, wherein the conveyer includes a plurality of rows having a plurality of recesses provided therein, and the integrated laser/galvo marking unit is configured to simultaneously laser multiple ones of said pellet-shaped articles in a common row.

7. A system according to claim 5, wherein the engraving comprises multiple markings that are partially overlapping.

8. A method of marking a plurality of edible pellet shaped articles, comprising:
conveying the pellet shaped articles along a transport direction, each of the pellet shaped articles comprising a coating at least one layer beneath the coating which has at least one color and/or characteristic that is different from the coating; and
lasering the pellet shaped articles with at least one laser beam so as to reveal at least part of the at least one layer, so as to create a visible multi-colored/textured design on the pellet shaped articles,
wherein the design includes an alphabetical character, a numeric character and/or a logo.

9. The method according to claim 8, without a mask for the laser beam.

10. The method according to claim 8, wherein the lasering includes two laser beams.

* * * * *